Feb. 23, 1965 H. G. JERIE 3,170,626
ANALOGUE DEVICE ESPECIALLY FOR THE COMPUTATION AND ADJUSTMENT
OF TRILATERATION NETS
Filed Feb. 26, 1960 2 Sheets-Sheet 1

*INVENTOR.*
HANS GEORG JERIE

BY *Hammond & Littell*

*ATTORNEYS*

United States Patent Office 3,170,626
Patented Feb. 23, 1965

3,170,626
ANALOGUE DEVICE ESPECIALLY FOR THE COMPUTATION AND ADJUSTMENT OF TRILATERATION NETS
Hans Georg Jerie, Freyung 6/11, Vienna I, Austria
Filed Feb. 26, 1960, Ser. No. 11,198
7 Claims. (Cl. 235—61)

The invention relates to mechanical means to be used as an analogue device and to a method for solving equations which proceed from the method of least squares, more in particular for the adjustment of trilateration networks.

The adjustment of trilateration networks includes the following problem:

Between a number of points in a surface, some of which have an exactly known position and some of which have an unknown position, distances are measured by means of some known method (for example by an electronic distance measuring method), more distances being measured than is strictly necessary for the calculation of the positions of the said points. The assembly of said distances is called a distance network or trilateration network. Since all the distances measured contain unavoidable errors, the most probable position has to be determined by an adjustment calculation with the aid of the method of the least squares.

In mathematically solving the problem by means of the method of the least squares which has been frequently used up till now, very complicated systems of linear equations have to be solved, in particular when the co-ordinates of a great many points have to be determined, which often gives rise to great difficulties.

The object of the invention is to provide a method and a mechanical means with which the said adjustment can be accomplished in a much shorter time which need not be operated by highly qualified personnel.

Another object of the invention is to provide a mechanical analogue device in which the said adjustment is obtained by making use of the known analogy between a mechanical elastic system and the adjustment theory.

Other objects of the invention will appear from the description below. My analogue device comprises:

(1) A base member, such as a table, having a smooth surface which is preferably covered with drawing paper or graph paper and which can be subjected to a vibratory or shaking movement. Advantageously a vibration device driven by an electric motor is mounted onto said base member. However, in some cases the base member may be shaken by hand.

On said base member, preferably covered with graph paper, the co-ordinates of the known points are plotted in a certain scale (scale $m_1$, the mapping scale).

(2) A number of marking devices which represent the various points, such as studs (rods provided with an axial bore and, at the lower side with a supporting flange), said studs being known per se in the field of art. Pins or needles can be put in the said bores in order either to pin the studs onto the positions plotted or to mark the positions of the points obtained.

(3) A number of elements which are hereinafter called distance rods, each of which comprises a rigid rod provided with two fixing elements which are slidable thereon, one of which (the "free" one) is fixable in an arbitrary position by means of a set screw, the other one being bound elastically on both sides by means of a pair of easily replaceable elastic means such as helical springs. Each of said fixing elements is adapted to be mounted on one of said marking devices.

(4) One or more auxiliary devices which are hereinafter called setting devices, and which are employed to set the free fixing element of a distance rod at a predetermined distance from the equilibrium position of the elastically bound fixing element in order that they may represent the end-points of a certain distance, in particular when each one is mounted onto a stud of the assembled network.

To illustrate the invention, an embodiment of the invention is shown in the drawing, in which.

Figure 1:
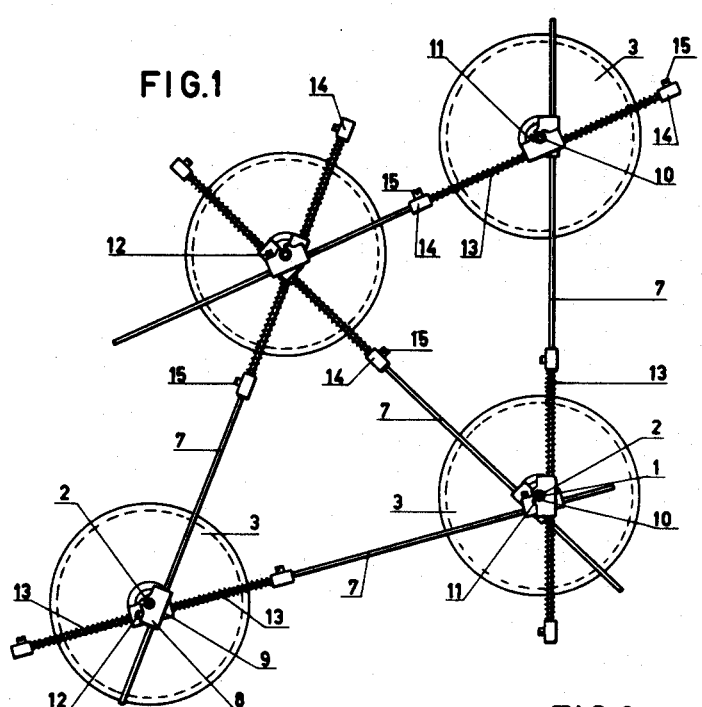
FIG. 1 is an upper view of four studs with distance rods mounted therebetween.

The marking devices each contain a stud 1 provided with an axial bore 2 and with a flange-like supporting member 3 which has an elevated central part 4 and which is provided on its lower outer side with a rim 5.

Figure 3:
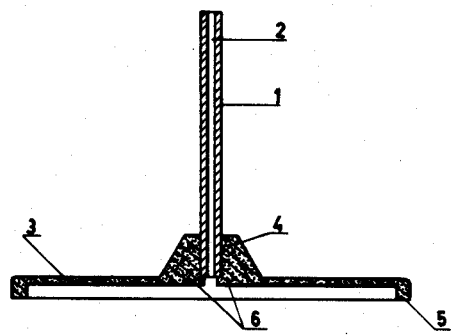
FIG. 3 is a vertical cross-section of a stud, along the line III—III in FIG. 4.
Figure 4:
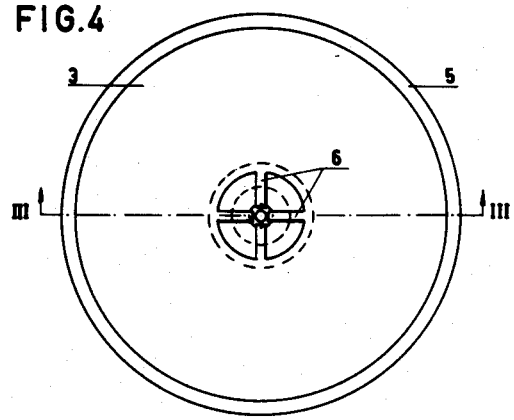
FIG. 4 is a bottom view of a marking device.

The elevated part is not massive, but it contains supporting ribs 6 as shown in FIGS. 3 and 4.

The marking devices, which represent the points of the network, are linked together by distance rods which are constructed of rigid rods 7 and, slidingly arranged thereon, an adjustable fixing element 8 and an elastically bound fixing element 9. Both of said elements are preferably constructed of a synthetic resin material, such as a polyamide or a polyester and are provided with gaps 10 which are adapted to slide along the studs 1 and to be arranged thereon and removed therefrom in a side-way direction by means of slightly elastic flaps 11. The adjustable fixing element 8 contains a set screw 12. The elastically bound fixing element is arranged between two helical springs 13 which are closed in between two removable setting elements 14 provided with set screws 15. In general the setting elements are adjusted so as just to ease the springs.

FIG. 1 shows a part of a distance network. In general, the more distance rods are joining in one point (on one stud) the more precise the position of said point is determined.

Figure 2:
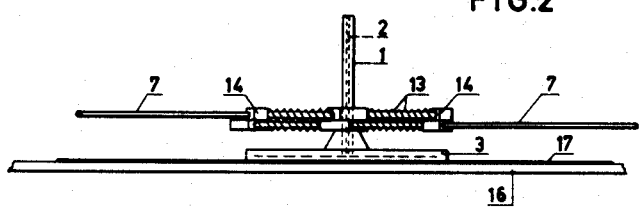
FIG. 2 is a side view of one of the studs of FIG. 1.

FIG. 2 also shows a part of the base member 16 provided with graph paper 17.

Figure 5:
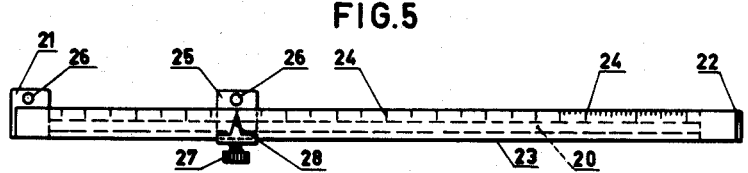
FIG. 5 is an upper view of a setting device.
Figure 6:
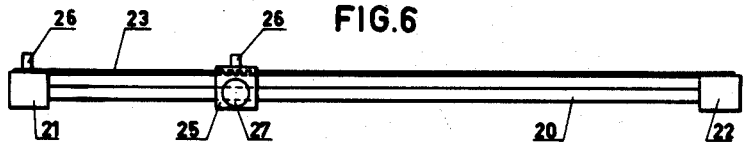
FIG. 6 is a side view of the device of FIG. 5.

In the setting device of FIGS. 5 and 6, a bar 20 is provided with two heads 21 and 22.

A strip of metal 23, provided with a scale calibration 24, is mounted between said heads. A setting element 25 is slidingly mounted on the bar 20.

The head 21 and the element 25 both contain a cylindrical pin 26 having the same diameter as the studs 1 so that both fixing elements of a distance rod can be placed on said pins in order to set the adjustable fixing element 8 at a predetermined distance from the equilibrium position of the elastically bound fixing element 9 which position is fixed by tightening the set screw 12. The setting element 25 is provided with a set screw 27 and with a pointer 28 which serves to read the distance between both pins on the scale calibration 24.

My method comprises the following steps:

(a) The zero position of an elastic system, which is an analogue of the adjustment problem to be solved, is determined.

To this end, the co-ordinates of the known points are plotted on the base member, preferably covered with graph paper, whereupon the marking elements (studs) are pinned onto said plotted positions.

Then, a distance rod is prepared for each distance measured, in such a way that the elastic constant of the elastical means used, such as a pair of springs, is proportional to the "weight" of the distance measurement concerned and that the distance between both fixing elements of the rod equals the distance measured in the mapping scale ($m_1$). The latter operation is carried out with the aid of the setting devices mentioned above.

As is known in the art, the weight of a measurement is inversely proportional to the square of the mean square error of said measurement.

Now, all of the distance rods with the fixed studs of the known points and with the freely slidable studs of the unknown points are arranged on the base member to form an assembly which is an analogue of the trilateration network. After shaking or vibrating the table, the zero positions of the unknown points, thus obtained, are marked on the base member, preferably covered with graph paper by pinning needles through the said studs.

(b) The differences (discrepancies) between the values of the distances measured (in the field) and of the distances computed from the approximate values of the co-ordinates of the points (which approximate values are obtained by any arbitrary method) are calculated. Such a method is for instance the scaling of the zero-position (see above) of the unknown points.

A method which gives more exact results is their calculation from the distances measured.

(c) The said discrepancies are introduced into the rods, in such a way, that the distances between the fixing elements are modified by values corresponding to said discrepancies in an appropriate scale, the correction scale ($m_2$) which is larger than the mapping scale ($m_1$).

The distance between the fixing elements $d_{ik}$ can now be expressed by the following formula:

$$d_{ik} = D_{ik}.m_1 + \Delta D_{ik}.m_2$$

in which $D_{ik}$ is the real distance as it is measured in the field and $\Delta D_{ik}$ the discrepancy computed for said distance.

When the distance rods thus modified are again arranged into an assembly and the table is vibrated so that the assembly gets in an equilibrium position as to the elastic forces of the rods, the freely slidable studs are shifted over a certain distance with regard to their (marked) zero position. The new equilibrium position of the studs is marked on the base member, preferably covered with graph paper, by pinning needles through the axial bores of the studs.

The magnitudes of the displacements of the slidable studs are measured on the base (in the correction scale $m_2$). They correspond to the required corrections of the approximate co-ordinates of the unknown points, which corrections are the same as those which could have been calculated in a very cumbersome way by means of the method of the least squares. If necessary, the operation described (steps b and c) is repeated several times, using a larger correction scale each time, until with the iteration method described the aim of the adjustment treatment has been reached.

*Example*

The numerical application of my method and device is elucidated by the following example, which for the sake of shortness is restricted to the data of two definite points (point 1 and point 2) of a network. The distance measured 1–2 amounts to 3967.24 meter. The plotting scale is 1:30,000 (so that the distance 1–2 to be plotted is 132 millimeter).

Tables A and B show the results of the measurements and calculations of the co-ordinates and distances respectively of points 1 and 2. The Roman ciphers (I, II, III, IV) denote the iteration steps. Table A shows, for each iteration step, the approximate co-ordinates, the corrections of the co-ordinates (in mm.), obtained from the analogue device and thereafter the corresponding correctness of the real co-ordinates in meters. The addition of the co-ordinate correctness to the approximate co-ordinates yields the corrected approximate co-ordinates.

In Table B, the approximate co-ordinates of the endpoints of the distance concerned are given for each iteration step, as well as the co-ordinate difference calculated by the abstraction of said co-ordinates and beside it is listed the distance $D^1$ calculated from said difference. This is compared with the measured value of the distance $D$ (in meters) and thus the discrepancy $\Delta D$ is obtained. After choosing the appropriate correction scale, the discrepancy $\Delta d$ is expressed in mm. and, finally, the corrected distance $d^1$ which is to be introduced into the assembly. Corresponding data are shown for the further iteration steps. The mapping scale is chosen so that the shortest distance $d$ will not be less than about 120 mm.; the correction scale is chosen so, that the highest of the discrepancies $\Delta d$ is about 20 to 25 mm. The correction scales in this example are:

I. 1:1,000
II. 1:100
III. 1:10

(A) CO-ORDINATES AND CO-ORDINATE CORRECTIONS OF THE POINTS

|   | Point 1 | | | | Point 2 | | | |
|---|---|---|---|---|---|---|---|---|
|   | X | | Y | | X | | Y | |
|   | Mm. | Meter | Mm. | Meter | Mm. | Meter | Mm. | Meter |
| I | −31 | 443 680.00<br>−31.00 | +27 | 194 260.00<br>+27.00 | −22 | 442 540.00<br>−22.00 | +06 | 190 480.00<br>+6.00 |
| II | +13 | 443 649.00<br>+1.30 | −14 | 194 287.00<br>−1.40 | −23 | 442 518.00<br>−2.30 | −22 | 190 486.00<br>−2.20 |
| III | −12 | 443 650.30<br>−0.12 | +04 | 194 285.60<br>+0.04 | +12 | 442 515.70<br>+0.12 | +16 | 190 483.80<br>+0.16 |
| IV |   | 443 650.18 |   | 194 285.64 |   | 442 515.82 |   | 190 483.96 |

B. DISTANCES AND THEIR DISCREPANCIES

|   |   | DISTANCE 1–2 | | D/d | Meter | Mm. |
|---|---|---|---|---|---|---|
|   |   | X | Y |   | 3967.24 | 132 |
| I | 1<br>2 | 443 680.00<br>442 540.00<br>1 140.00 | 194 260.00<br>190 480.00<br>3 780.00 | $D^1$<br>$\Delta D^1/\Delta d$<br>$d^1$ | 3948.16<br>+19.08 | +19<br>151 |
| II | 1<br>2 | 443 649.00<br>442 518.00<br>1 131.00 | 194 287.00<br>190 486.00<br>3 801.00 | $D^2$<br>$\Delta D^2/\Delta d$<br>$d^2$ | 3965.70<br>+1.54 | +15<br>147 |
| III | 1<br>2 | 443 650.30<br>442 515.70<br>1 134.60 | 194 285.60<br>190 483.80<br>3 801.80 | $D^3$<br>$\Delta D^3/\Delta d$<br>$d^3$ | 3967.49<br>−0.25 | −25<br>107 |
| IV | 1<br>2 | 443 650.18<br>442 515.82<br>1 134.36 | 194 285.64<br>190 483.96<br>3 801.68 | $D^4$<br>$\Delta D^4/\Delta d$<br>$d^4$ | 3967.31<br>−0.07 |   |

The proof that the corrections to the approximate co-ordinates are identical to those formed by the method of the least squares, can be given by using a well-known mechanical law. According to this law the equilibrium of an elastic system is reached when the sum of all the static energies is at a minimum. The energy, needed for displacing an elastically bound fixing element with respect to the other one of the same distance rod is proportional to the square of this displacement multiplied by the elasticity coefficient of the springs used. As such a displacement corresponds to the correction of the distance observation, and as—as assumed—the elasticity coefficient is proportional to the "weight" of the observation as used for the corresponding numerical treatment the sum of the energies can be described with the expression $$g_a \cdot v_a \cdot v_a = \text{minimum}$$

where $g_a$ denotes the weight of observation $\alpha$ as well as the elasticity coefficient of the springs, $v_a$ denotes the correction of the observation $\alpha$, as well as the displacement of the fixing element. Thereby it is proved that the equilibrium of the elastic system corresponds to the condition for the adjustment according to the method of the least squares.

What I claim is:

1. A mechanical analogue device for adjusting trilateration nets comprising a base member having a smooth flat surface, marking devices slidably arranged on said smooth surface, marking devices affixed to said smooth surface denoting known points, said marking devices provided with studs standing perpendicular to said smooth surface, distance rods, each of said distance rods having a first fixing element slidably mounted on said rod, a fixing means to fasten said fixing element to said rod in a predetermined position, two setting elements slidably mounted on said rod, fixing means to fasten said setting elements to said rod in predetermined positions, a second fixing element slidably mounted on said rod between said setting elements, two elastic means deformable in longitudinal direction of said rod, each of said elastic means abutting said second fixing element and one of the setting elements, said fixing elements further comprising adjacent to said rod means adapted to connect said fixing elements freely rotatably to said studs of said marking devices in such a manner that said marking devices and distance rods can be arranged into an assembly in which the known points are represented by said marking devices affixed to said smooth surface and the unknown points are represented by said marking devices slidably arranged on said smooth surface, which assembly will compensate for the errors in measurement of the distances between the various points represented by said marking devices by adjustment of said slidably mounted fixing elements on each of said distance rods.

2. A mechanical unit for adjusting trilateration nets comprising a distance rod, a first fixing element slidably mounted on said rod, a fixing means to connect said first fixing element to said rod in a predetermined position, two setting elements slidably mounted on said rod, fixing means to connect said setting elements to said rod in predetermined positions, a second fixing element slidably mounted on said rod between said setting elements, two elastic means each of which abuts one of the said setting elements at one end and the second fixing element at its other end, said fixing elements further comprising means adapted to connect said elements freely rotatably to vertical posts of studs.

3. A mechanical unit according to claim 2, characterized in that said elastic means consists of a helicoidal spring around said rod and spaced therefrom to enable a longitudinal movement of the windings.

4. A mechanical unit according to claim 2, characterized in that said means adapted to connect the fixing elements freely rotatably to said vertical posts of studs, consists of a gap in the body of said fixing elements flanked by at least one slightly elastic flap.

5. The method for compensating for errors in measurement of distances in establishing a trilateration network which comprises the steps of plotting the co-ordinates of known points in said network in a mapping scale, elastically connecting the known points with the unknown points in proportion to the distances previously measured whereby the distance between the known and unknown points can vary depending upon an elastic stress set up due to errors in measurement of the distances and whereby said elastic stress is proportional to the errors in measurement of the distances measured, bringing the trilateration network assembly into a state of static equilibrium as to the elastic stresses, plotting the first co-ordinates of the unknown points, thus establishing the zero position of the trilateration network, calculating the discrepancies between the real distances measured and the distances computed from the first co-ordinates of said unknown points, elastically reconnecting the known points with the unknown points in proportion to the distances previously determined as modified by amounts which correspond to said discrepancies proportional to a first correction scale which is larger than said mapping scale, whereby the distance between the known and unknown points can vary depending upon an elastic stress set up due to errors in measurement of the distance measured as modified by said discrepancy correction, re-bringing the trilateration network assembly into a state of static equilibrium as to the elastic stresses and plotting the second co-ordinates of the unknown points, thus establishing modifications of the co-ordinates of the unknown points, which modifications correspond to the corrections of the measured distances.

6. The method of claim 5 wherein a further correction is made by the steps of calculating the discrepancies between the real distances measured and the distances computed from the second co-ordinates of said unknown points, elastically reconnecting the known points with the unknown points in proportion to the distances previously determined as modified by amounts which correspond to said discrepancies proportional to a second correction scale which is larger than said first correction scale, whereby the distance between the known and unknown points can vary depending upon an elastic stress set up due to errors in measurement of the distance measured as modified by said discrepancy correction, re-bringing the trilateration network assembly into a state of static equilibrium as to the elastic stresses and plotting the third co-ordinates of the unknown points, thus establishing modifications of the co-ordinates of the unknown points, which modifications correspond to the corrections of the measured distances, and repeating the above steps utilizing a larger correction scale each time and each time introducing the corrections established the previous time, until the required precision of the co-ordinates of the unknown points is established.

7. The method of claim 6 wherein each correction scale is about 10 times larger than the previous correction scale.

References Cited in the file of this patent

UNITED STATES PATENTS

| | | |
|---|---|---|
| 522,053 | Gates | June 26, 1894 |
| 1,965,098 | Eaton | July 3, 1934 |
| 2,178,293 | Wogeck | Oct. 31, 1939 |
| 2,182,707 | Shipman | Dec. 5, 1939 |
| 2,221,872 | King et al. | Nov. 19, 1940 |
| 2,493,786 | Swift | Jan. 10, 1950 |
| 2,537,718 | Trorey | Jan. 9, 1951 |
| 2,693,033 | Acker et al. | Nov. 2, 1954 |

FOREIGN PATENTS

| | | |
|---|---|---|
| 128,245 | Australia | July 6, 1948 |